United States Patent [19]
Aref

[11] Patent Number: 5,528,701
[45] Date of Patent: Jun. 18, 1996

[54] TRIE BASED METHOD FOR INDEXING HANDWRITTEN DATABASES

[75] Inventor: Walid G. Aref, Monmouth Junction, N.J.

[73] Assignee: Panasonic Technologies, Inc., Princeton, N.J.

[21] Appl. No.: 300,795

[22] Filed: Sep. 2, 1994

[51] Int. Cl.$^6$ .................................................... G06K 9/70
[52] U.S. Cl. ........................ 382/178; 382/186; 382/226
[58] Field of Search ................................ 382/186, 187, 382/226, 227, 228, 229, 173, 177, 179; 395/600, 2.52, 2.63, 2.65; 364/274.3, 274.4, 283.2, 926.8, 974.1, 974.3; 381/43

[56] References Cited

U.S. PATENT DOCUMENTS

| | | | |
|---|---|---|---|
| 4,654,875 | 3/1987 | Srihari et al. | 382/40 |
| 4,819,271 | 4/1989 | Bahl et al. | 381/43 |
| 5,067,165 | 11/1991 | Nishida | 382/19 |
| 5,151,950 | 9/1992 | Hullender | 382/13 |
| 5,202,986 | 4/1993 | Nickel | 395/600 |
| 5,377,281 | 12/1994 | Ballard et al. | 382/40 |
| 5,390,278 | 2/1995 | Gupta et al. | 395/2.52 |
| 5,392,363 | 2/1995 | Fujisaki et al. | 382/13 |

OTHER PUBLICATIONS

D. P. Lopresti et al., "Pictographic Naming", *Interchi '93 Adjunct Proceedings*, Conference on Human Factors in Computing Systems, pp. 77–78 (Apr., 1993).

A. B. Poritz, "Hidden Markov Models: A Guided Tour", *IEEE International Conference on Acoustics, Speech, and Signal Processing*, vol. 1, pp. 7–13 (Apr. 1988).

F. Jelinek, "Continuous Speech Recognition by Statistical Methods", *Proceedings of the IEEE*, vol. 64, No. 4, pp. 532–556 (Apr. 1976).

B. K. Sin et al., "A Statistical Approach wth HMMs for On–Line Cursive Hangul (Korean Script) Recognition", *IEEE International Conference on Document Analysis and Recognition*, pp. 147–150 (Oct. 1993).

E. Fredkin et al., "Trie Memory", *Communications of the ACM*, vol. 3, No. 9 pp. 490–500 (Sep. 1960).

A. J. Viterbi, "Error Bounds for Convolutional Codes and an Asymptotically Optimum Decoding Algorithm", *IEEE Transactions on Information Theory*, vol. IT–13, No. 2, pp. 260–269 (Apr. 1967).

*Primary Examiner*—Leo Boudreau
*Assistant Examiner*—Andrew W. Johns
*Attorney, Agent, or Firm*—Ratner & Prestia

[57] ABSTRACT

A method is disclosed for matching input data representing a continuous combination of input objects to a plurality of objects in a trie database structure. This data structure has a plurality of nodes partitioned into a plurality of levels. Each node in the Trie includes a plurality of elements where each element corresponds to a respective one of the component objects. In addition, a hidden Markov model corresponding to the component object is associated with the element in the database. According to the method, the input object is applied to each of the hidden Markov models associated with the respective plurality of elements of a node to generate a respective plurality of acceptance values. The element which generates the largest acceptance value is identified with a segment of the input data. The component object for this element is recorded and the identified segment is deleted from the input data string. These steps are repeated at successive levels of the Trie data structure until each segment of the input data has been identified with an element of a node of the Trie data structure. The input data is matched with the objects stored in the database by concatenating the component objects associated with the respective identified elements.

9 Claims, 11 Drawing Sheets

TRIE BASED METHOD FOR INDEXING HANDWRITTEN DATABASES

BACKGROUND OF THE INVENTION

The present invention relates to methods of incorporating non-traditional objects in database systems and in particular to a method for employing a Trie data structure to implement a database of handwritten symbols.

The maintenance and indexing of databases having traditional objects such as letters, numbers and words is well known. U.S. Pat. No. 5,202,986 entitled PREFIX SEARCH TREE PARTIAL KEY BRANCHING, describes a specialized tree structure for database searching. The technique disclosed in this patent is based on prefixes of letters or numbers. This patent also describes a Trie based system which compares individual characters and an input word to match the input word to a word in the database. Even for the traditional objects described in this patent, the Trie based system is not preferred because it requires all possible characters for the search key to be partitioned into individual disjoint classes, where each class has a first level branch. In addition, the Trie data structure is described as containing a number of levels corresponding to the number of characters in the longest expected search key.

While it is relatively easy to index databases of traditional objects, it is more difficult to index databases of non-traditional objects such as handwritten text or symbols. These difficulties arise mainly from problems in matching similar handwritten words. It is difficult, for example, for one person to write a word the same way twice. It is even more difficult for one person to write a word in the same way that another person has written it. This inconsistency in the representation of non-traditional objects makes it difficult to match and retrieve handwritten information.

U.S. Pat. No. 5,151,950 entitled, METHOD FOR RECOGNIZING HANDWRITTEN CHARACTERS USING SHAPE AND CONTEXT ANALYSIS describes a system in which a Trie data structure is used to hold a dictionary of words that may be recognized by a handwritten character recognition system. This system includes two parts, a shape recognizer and a set of deterministic finite automata (DFA). In this application the Trie data structure is used as the DFA. At each level of the Trie data structure, the shape recognizer is passed an input string and returns a number of possible matching characters. The Trie data structure is then used to determine if any of the recognized characters is proper at this level for a sequence of characters (i.e. a word) that is stored in the database. This method, however, requires extensive operations by the shape recognizer. This component of the system must apply each letter model in the alphabet to the input string at each level of the Trie. The technique described in this patent only works for manuscript (hand-printed) text, i.e., non-cursive text. Manuscript text is more easily segmented than cursive text.

Ideally, the database of words which can be recognized should only hold one representation of a word and the system which uses the database should be able to recognize similar words without the need to store each different version. Hidden Markov models (HMMs) have been proposed as an alternative representation for handwritten words. In the HMM approach, each handwritten word in a database is represented by a statistical model, the HMM. Each HMM is trained so that it accepts the specific word with a high probability relative to other words in the database. In systems which use HMMs to recognize handwritten words, a separate HMM is stored for each word in the database. In order to recognize a given input word, each HMM in the database is executed and the one which accepts the input word with the highest probability is selected as the matching HMM. Because each HMM in the underlying handwritten database has to be tested against the input word, this system operates in a linear process where the speed of execution is a formidable obstacle. In an article by Lopresti et al. entitled,"Pictographic Naming" *Interchi '93 Adjunct Proceedings*, pages 77–78, 1993, a search of this type through a database of 60 words is described as taking approximately 20 seconds to execute on a NeXT Station running at 40 Mhz.

SUMMARY OF THE INVENTION

The present invention is embodied in a method for matching a sequence of input data representing a continuous input object to a plurality of component objects in a database. The database is formed using a Trie data structure. This data structure has a plurality of nodes partitioned into a plurality of levels. Each node in the Trie includes a plurality of elements where each element corresponds to a respective component object in the set of component objects. In addition, a hidden Markov model corresponding to the component object is associated with the element in the database. According to the method, a node in the Trie data structure is selected and the input object is applied to each of the hidden Markov models associated with the respective plurality of elements of the node to generate a respective plurality of acceptance values. The element which generates the largest acceptance value is identified with a segment of the input data. The object for this element is recorded and the identified segment is deleted from the input data string. These steps are repeated at successive levels of the Trie data structure until each segment of the input data has been identified with an element of a node of the Trie data structure. The input data is matched with the objects stored in the database by concatenating the component objects associated with the respective identified elements.

DETAILED DESCRIPTION

While the exemplary embodiment of the invention is described in the context of a system for recognizing continuous handwritten text, it is contemplated that it may be applied to other systems in which continuous data is to be segmented into components and the components associated with objects. For example, the system may be applied to a speech recognition system in which individual words are stored into a Trie data structure and the component objects are phonemes. Alternatively, it may be applied to a speech recognition system at a higher level in which continuous speech phrases are stored into the Trie data structure and the component objects are individual words. These two implementations may be combined to produce a two-level system in which one Trie data structure holds the individual words in the form of their component phonemes and a higher level data structure holds the individual phrases in the form of their component words. It is also contemplated that a system according to the present invention may be applied to recognize other types of input data which is not easily segmented, such as hand-drawn pictures.

Figure 2:
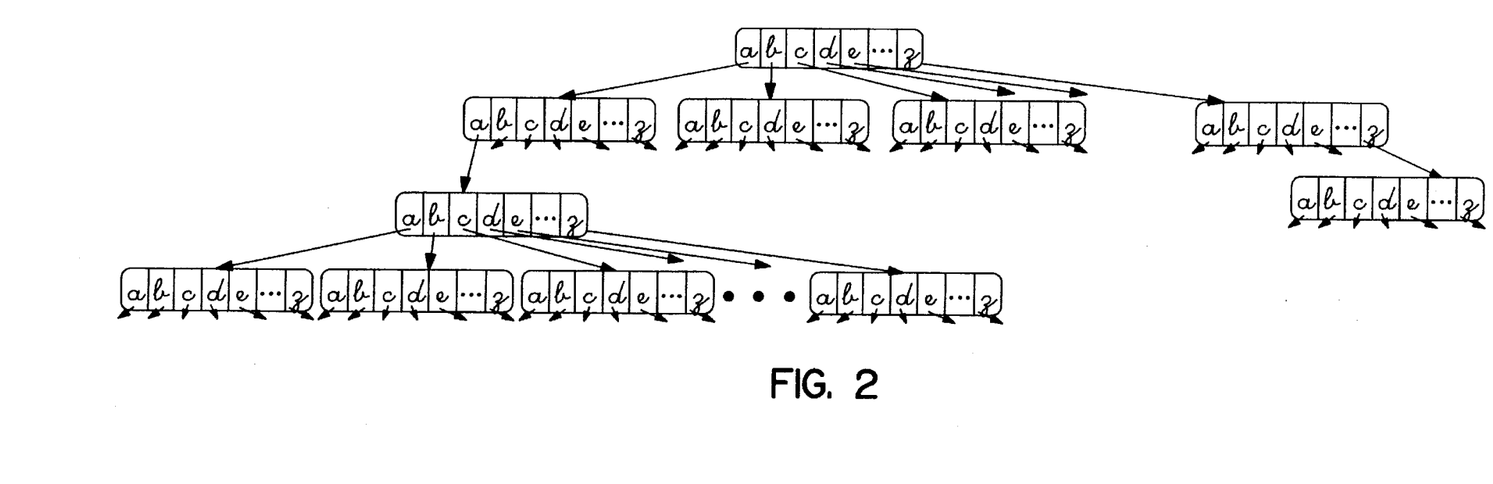
FIG. 2 is a data structure diagram which illustrates an exemplary handwritten Trie data structure.

The Trie data structure is a well known structure which has been used for indexing data stored in a database. The Trie may be considered to be an m-way tree consisting of a plurality of nodes each node having m entries and a pointer to another node. In most database implementations, each entry in the Trie corresponds to a digit or a character of an alphabet. FIG. 2 shows an example of a Trie data structure for holding handwritten text while FIG. 3 shows an example of a Trie in which the alphabet is the digits 0 to 9.

Figure 3:
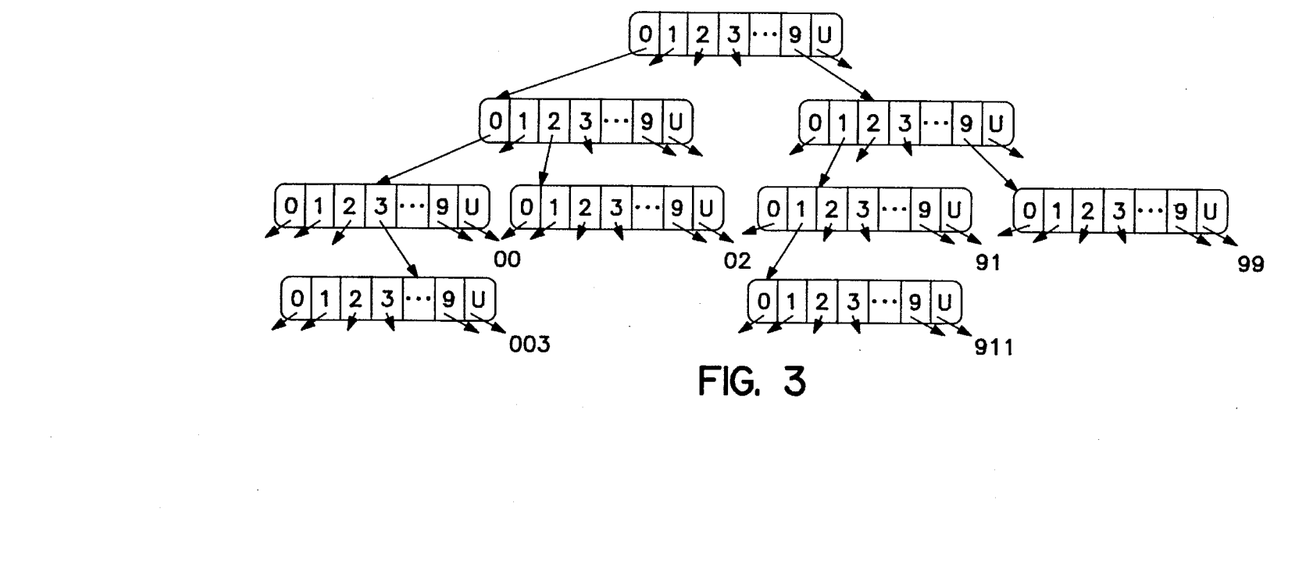
FIG. 3 is a data structure diagram which illustrates principles of operation of systems using Trie data structures.

In the Trie data structure shown in FIG. 3 each node on a level 1 of the Trie represents a set of all of the keys which begin with a certain character sequence of 1 characters. The node also specifies an m way branch, depending on the 1+1th character. It is noted that in each node of the Trie data structure shown in FIG. 3 an additional null entry has been added to allow for storing 2 numbers, a and b where a is a prefix of b. Thus in a Trie data structure, each node may be both a branch node and leaf node.

The searching of the Trie data structure shown in FIG. 3 is a relatively simple operation. The first digit in the number is compared to each element of the first node until a match is found. The identified element then points to a second node in the Trie which is used to locate the second digit in the input number. When the matching digit in the second node is found for the second digit in the input number, a node to be used to identify the third digit of the number is identified. This operation continues until all of the digits in the input number have been consumed. At this point, the null entry in the last node that was located holds the identified number. In a data based system this node may also hold a pointer to other fields in a database record that are associated with the identified key.

Although the Trie data structure is generally modeled as an M-ary tree, it is contemplated that the memory space used by the Trie structure may be reduced by using a linked list for each node. The use of a linked list in conjunction with the Trie reduces the memory space because most of the elements in the nodes of the Trie data structure tend to be empty.

By this alternative implementation, the Trie data structure would be replaced by a forest of trees. Searching in such a forest would proceed by finding the tree having a root node which matches the first letter in the input word, and then finding the descendant nodes from that root that match the successive letters of the word.

Another alternative implementation of the Trie data structure would be as a hybrid between the Trie data structure and some other structure. For example, the Trie data structure may be used to identify the first few characters of a word and some other data structure, for example a simple list may be used in a part of the tree where only a few objects may be encountered.

In the database applications described above, the Trie data structure has been used with an alphabet of well defined symbols, for example, the numbers 0 through 9 as shown in FIG. 3. One difficulty in using a Trie data structure with a handwritten database is the difficulty in differentiating between characters in the handwritten alphabet. As described above, several authors have used HMMs to model handwriting and handwritten documents. The materials that follow describe how HMMs may be combined with a Trie data structure to implement an effective indexing system for a handwritten database.

Figure 1:
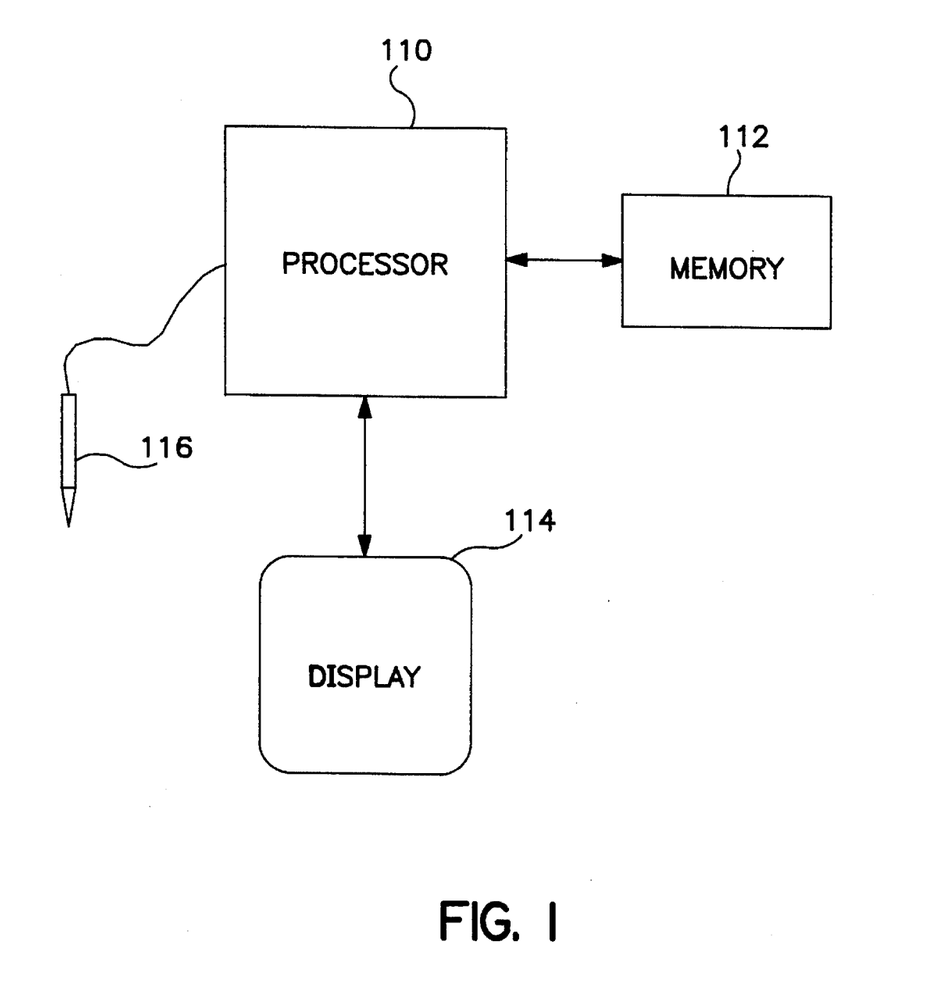
FIG. 1 is a block diagram of a pen based computer which may be used to implement the method of the present invention.

FIG. 1 is a block diagram of computer apparatus suitable for use with an exemplary embodiment of the invention. The exemplary apparatus includes a processor 110 and memory 112 forming a conventional computer such as a pen based personal digital assistant (PDA). Information produced by the computer is displayed on a display device 114. Data may be input to the computer via a pen like transducer 116. As characters are drawn, for example, on the display device 114, the transducer 116 provides 4 types of data values: direction of movement, velocity of movement, change in direction and change of velocity. As the information provided by the transducer 116 is digitized, each feature is quantized into a set of 4 possible values. Thus, any movement of the pen may be represented by an 8-bit value. In the exemplary embodiment of the invention, the quantized pen movements are used to form feature vectors or labels for hidden Markov models that are used to identify symbols (i.e. letters) from an alphabet of objects, $\Sigma$.

In the exemplary embodiment of the invention, we use a left to right HMM structure, where no state transitions are allowed which jump more than one state ahead. In this exemplary embodiment of the invention, each input state is represented by a cluster of feature vectors. A state change occurs only when there is a material change in the input feature vectors provided by the transducer 116.

Figure 4:
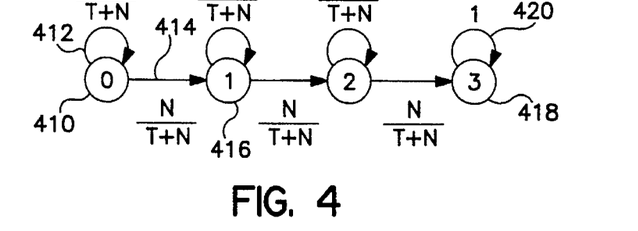
FIG. 4 is a state diagram representing a forward hidden Markov model.

An example of an HMM of the type used in the exemplary embodiment of the invention is shown in FIG. 4. This model includes 4 states numbered 0 to 3. The probability to jump from state I to state I+1, where I is less than 3, is N/(N+T), while the probability of staying in state I is T/(N+T). There is no transition from state 3 and the probability of remaining in state 3 is 1.

The HMM shown in FIG. 4 may be trained to accept a particular handwritten letter by assigning subsequences of a string of input symbols representing many examples of the letter to each of the 4 states. Each additional input sequence adds to a frequency distribution of the different input vectors which occur in each of the states. At the end of the training, this frequency distribution is normalized to obtain a probability distribution. In this exemplary embodiment of the invention, the transition probabilities are adjusted so that the HMM is encouraged to remain in a state until it consumes the symbols in the input pattern that have a high probability of correspondence to the symbols that were assigned to the state. The training process is completed by assigning a small probability value, $\epsilon$, to any objects which did not appear in the training patterns.

Figure 5:
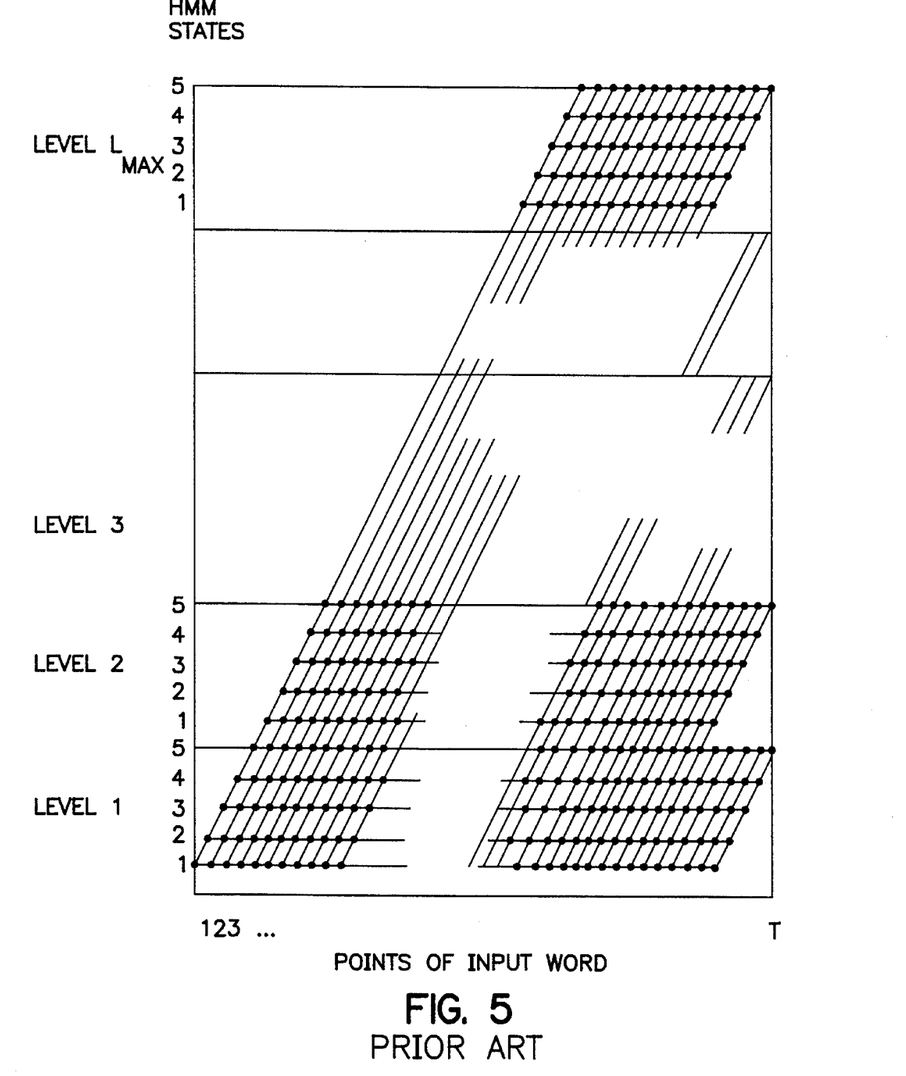
FIG. 5 (prior art) is a graph of input data versus hidden Markov model states which is useful for describing a method for recognizing handwritten text from the prior art.

Once an HMM has been constructed for each object of the alphabet $\Sigma$, the HMMs may be applied to recognize an input word. One method by which this may be done is to determine a maximum possible number of objects that can exist in the input word and then apply the HMMs for the objects in the alphabet to all possible levels. Since no object segmentation occurs in the input word, this algorithm needs to check all possible starting and ending points of each object. This algorithm is shown in FIG. 5. In this Figure, all the HMMs of the objects in $\Sigma$ are executed at level 1. At level 1, the starting point of each object is the first sample point of the input word w, while the location of the ending point varies from the $N^{th}$ sample point to the $T^{th}$ sample point of w.

At the first level, the HMM of given letter is executed for every possible ending position and the final probability value for that letter is computed. In FIG. 5, a horizontal line indicates that the HMM remains in the same state while consuming one point of the input word, while a line which goes up indicates a transition to the next state which consumes 1 point of the input word. Thus, each line of the graph shown in FIG. 5 is a separate probability computation which must be performed in order to recognize the T sample points of the input word. It is noted that, using the method shown in FIG. 5, considerable computation is needed to determine the respective probabilities that the first few input symbols represent each object in the alphabet $\Sigma$. These calculations must be repeated for each letter of the longest word that could be recognized.

The present invention reduces the level of computation needed to recognize a word by combining the hidden Markov model with a Trie data structure which represents all possible words in the database. In order to search for a handwritten word using the Trie, the algorithm starts at the root and descends the tree so that the path that is followed depends on the best match between the input sequence and an object, for example, a letter at level I of the Trie. Each object at each level is associated with a hidden Markov model for the object. This HMM is constructed so that it accepts this specific object with the high probability, relative to the other objects of the alphabet.

The Trie data structure is advantageous for two reasons. First, it prunes the search space since the search is limited to only those branches that exist in the Trie, that is to say to those words that exist in the database represented by the Trie. Second, using the Trie also helps add some semantic knowledge of the possible words to look for, as opposed to considering all possible letter combinations as was done in the conventional recognition method.

The implementation of a Trie data structure in an HMM based handwriting recognition system, however, is not a straight forward combination. Because the input handwritten word is cursive, characters in word are not segmented. For ease of recognition, these characters should be segmented so that each character can be used to match a corresponding character in one of the Trie nodes. In addition, extra strokes which are not defined in the models for the letters may be used to connect the letters in cursive writing. These strokes are desirably handled by any recognition algorithm in such a way that they do not interfere with the matching process.

Figure 6:
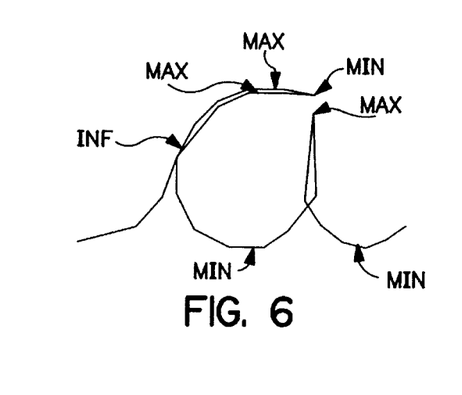
FIG. 6 is a drawing of a handwritten letter "a" which is useful for illustrating a first segmentation method according to the present invention.
Figure 7:
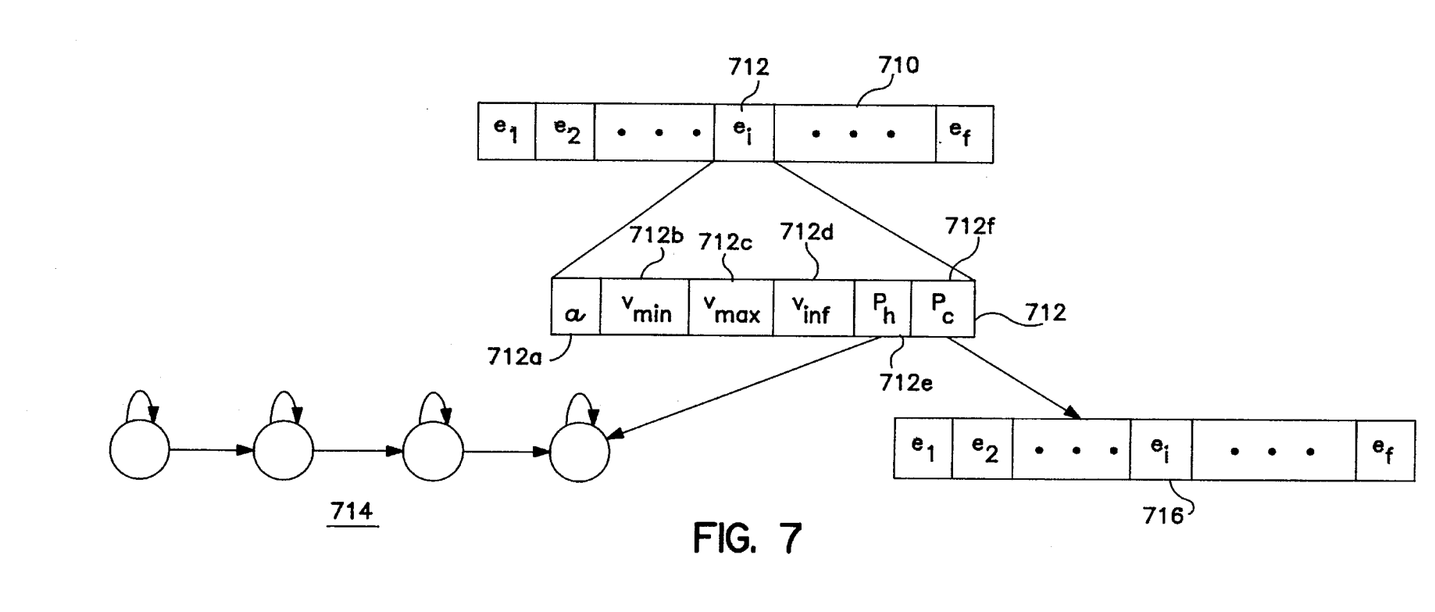
FIG. 7 is a data structure diagram which illustrates a Trie data structure suitable for use with the present invention and the first segmenting method.

One method of character segmentation is to use counts of minima, maxima and inflection points. This is illustrated in FIG. 6 for the letter "a". As shown in FIG. 6, one inflection point, three local maxima and three local minima are identified for the cursive letter "a." In a first exemplary embodiment of the invention, the number of local maxima, local minima and inflection points for each letter are stored in the respective elements of each node of the Trie. This is illustrated in FIG. 7. In this Figure, a node of the Trie 710 includes multiple elements E1, E2 . . . Ef. One of the elements, 712, is expanded to show the various fields that it contains. The first field 712a indicates the letter that is represented by the Trie element. The next three fields, $v_{min}$ 712b, $v_{max}$ 712c and $v_{inf}$ 712d, give the respective numbers of minima, maxima and inflection points that are encountered when the letter "a" is processed. The field $P_h$ 712e of the element shown in FIG. 7 points to the HMM that corresponds to the letter "a" while the field $P_c$ 712f, points to the node in the Trie that will be used to recognize the strokes in the input sequence that follow the strokes corresponding to the letter "a."

Figure 8A:
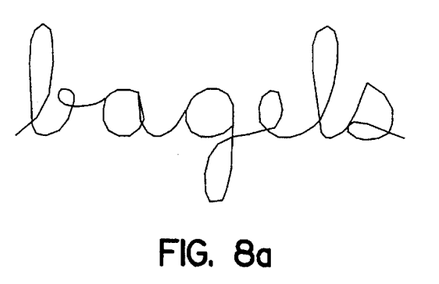
FIGS. 8*a* and 8*b* and 8*c* are drawings of handwritten words which illustrate the application of the first segmentation method.
Figure 8B:
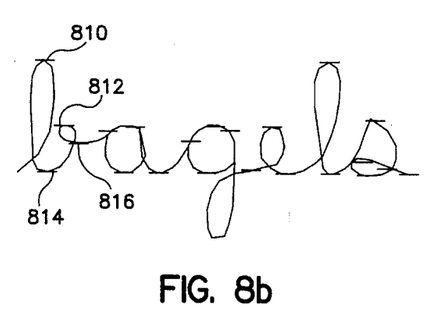

FIGS. 8a, 8b, 8c and 8d show the process that is used to recognize the cursive word "bagels" using the exemplary method. FIG. 8a shows the word "bagels" as it is written in cursive characters. In FIG. 8b, the word has been marked to indicate the minima, maxima and inflection points. For example, the maxima, 810 and 812 and minima 814 and 816 are recognized in the strokes that correspond to the letter "b." Although these points in the input sequence are marked by horizontal or vertical lines in FIG. 8b, it is understood that the minima, maxima and inflection points would be indicated in a manner that could be used by the system. For example, the system may maintain a list of the positions of the minima, maxima and inflection points with each member in the list corresponding to a respective stroke of the input sequence.

Figure 8C:
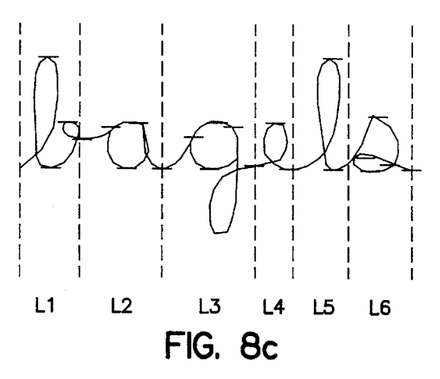
Figure 8D:
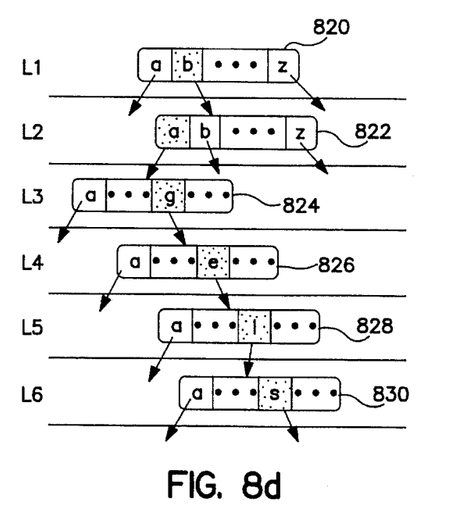
FIG. 8d is a data structure diagram of a Trie data structure that is useful for describing the operation of the exemplary method using the first segmenting method.

The next steps in the recognition process are shown in FIG. 8c and 8d. In these steps, each letter in the alphabet is compared to the starting sequence of strokes but, rather than try every possible ending point for the sequence to correspond to the letter, the analysis of each letter terminates when the respective numbers of minima, maxima and inflection points for that letter have been encountered in the input sequence. As each letter is recognized, the strokes in the input sequence that correspond to that letter, as delimited by the minima, maxima and inflection points, are deleted from the input sequence, and a new level in the Trie is executed to identify the next letter in the word.

Using this method, the letter "b" is recognized at level L1 using the HMM's of the elements contained in node 820.

Once the letter "b" has been recognized, the input sequence is trimmed to remove the strokes containing the number of maxima, minima and inflection points that were identified for the letter "b." The trimmed input sequence is applied to node 822 at level L2. In this example, the HMM in the element of this node which corresponds to the letter "a" has the highest probability in view of the new initial strokes in the input sequence. Accordingly, the letter "a" is recognized at level L2 of the Trie. The input sequence is again trimmed to delete the strokes corresponding to the letter "a" and the HMM's of node 824 are applied to the new starting strokes of the input sequence to recognize the letter "g." This method continues in this manner until the remaining letters in the word "bagels" have been recognized at nodes 826, 828 and 830.

In the exemplary embodiment of the invention, the final maximum or minimum of a letter is not pruned from an input sequence since this point in the input sequence may correspond to the first maximum or minimum of the next letter in the word. It is also noted that the computational burden is greatly reduced by the Trie data structure. If, for example, the only word in the database which includes the starting letters "bage" is "bagels," then to confirm that the written word corresponds to "bagels," the system only needs to determine, at levels L5 and L6 of the Trie, that it is more likely than not that the final strokes correspond to the letters "l" and "s." There is no need to perform the computations involved in comparing these strokes to the other letters in the alphabet Σ.

Figure 9:
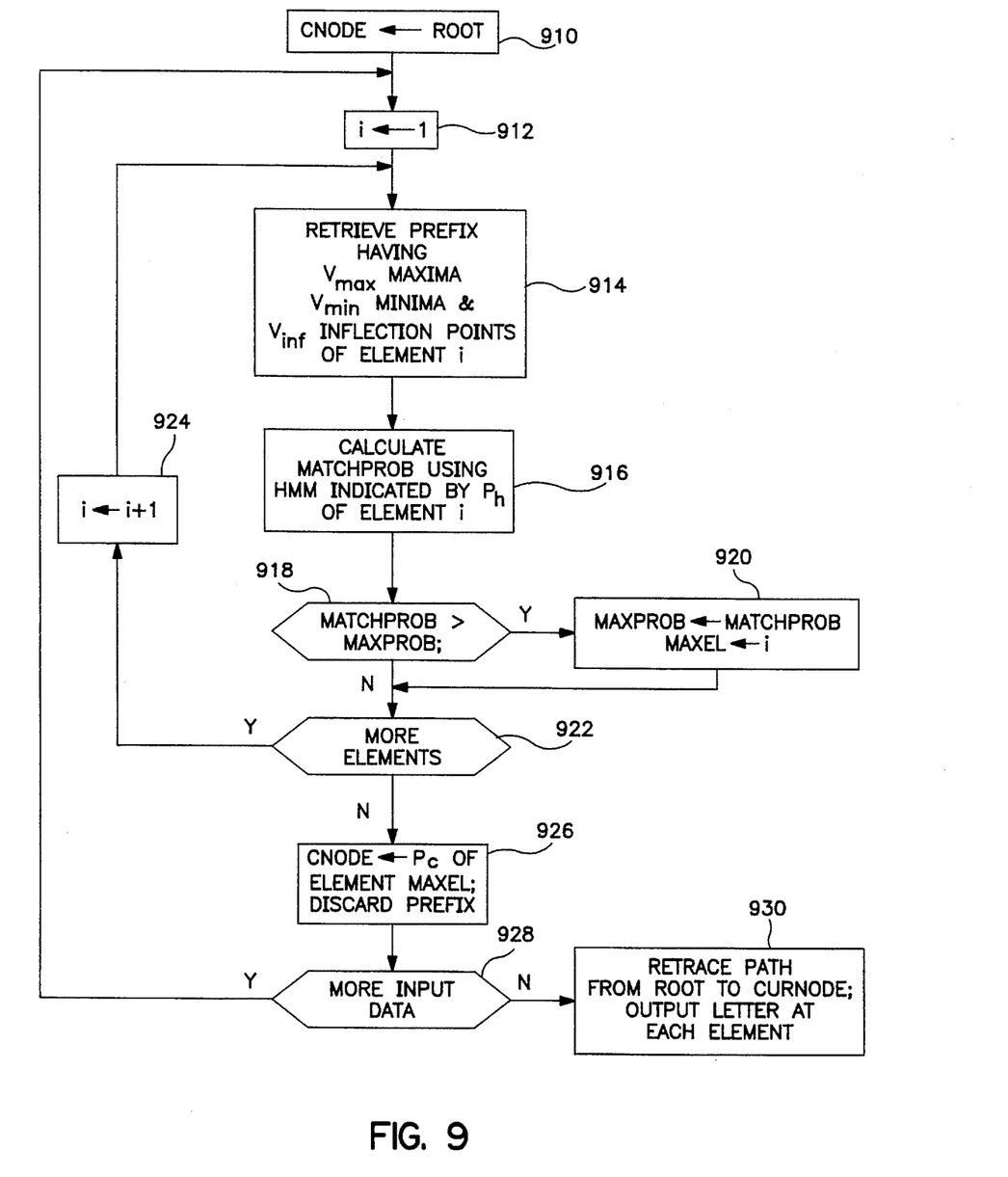
FIG. 9 is a flow chart diagram which illustrates the operation of the first exemplary method according to the present invention.
Figure 10:
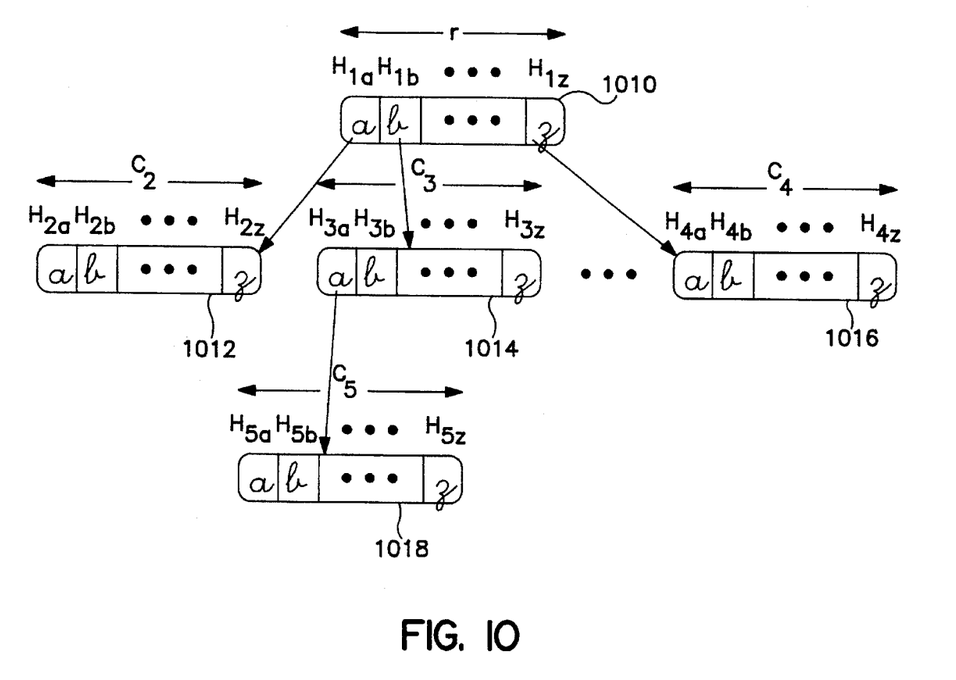
FIG. 10 is a data structure diagram which is useful for describing a second exemplary method according to the present invention.

The method according to this first embodiment of the invention is shown in the flow-chart diagram of FIG. 9. The first step in this method, step 910, assigns the root node of the Trie as the current node, CNODE, that is being used to analyze the input sequence. The next step 912 assigns a value of 1 to a variable i which is used to index through the elements of node CNODE. At step 914, the system retrieves the strokes in the input sequence having $v_{max}$ maxima, $v_{min}$ minima, and $v_{inf}$ inflection points, as defined by element i. Next, at step 916, the system calculates a probability value MATCHPROB, that the input sequence matches the letter represented by element i. At step 918, MATCHPROB is compared to a running maximum value MAXPROB. If MATCHPROB is greater than MAXPROB, then, at step 920, MATCHPROB is assigned as the new value for MAXPROB and the element index i is assigned to a variable MAXEL, the element index which corresponds to the maximum probability. If MATCHPROB is not greater than MAXPROB at step 918 or after step 920, step 922 is executed to determine if there are more elements at node CNODE. If so, the index i is incremented at step 924 and control is transferred to step 914.

If at step 922 it is determined that the last element in CNODE has been processed then, at step 926, the field $P_c$ of element MAXEL is assigned to CNODE and the prefix having the number of maxima, minima and inflection points indicated by the fields $v_{max}$, $v_{min}$ and $v_{inf}$ of node MAXEL is trimmed from the input sequence. At the next step, 928, the process determines if there are any strokes remaining in the input sequence. If there are, control is transferred to step 912 to process the new CNODE. Otherwise, control transfers to step 930 to retrace the path from the root node to CNODE and to output the letter at each branching element of each node in the path.

Figure 11:
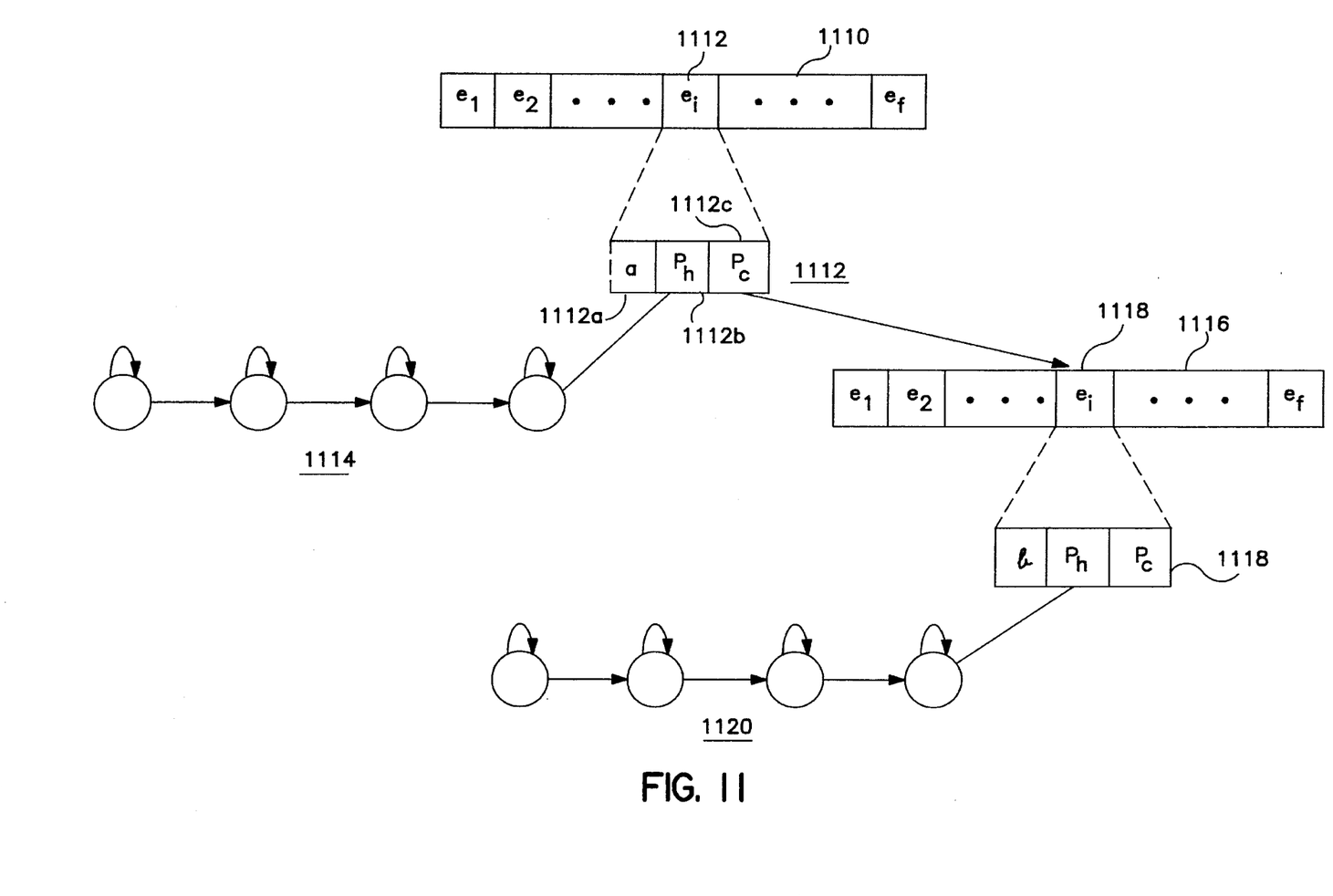
FIG. 11 is a data structure diagram which shows the data structure diagram in FIG. 10 in greater detail.

An alternative to the method outlined above is to use the Trie data structure with character partitioning and letter recognition performed using a modified Viterbi algorithm. FIG. 11 shows the Trie data structure that is used with this alternative embodiment of the invention. As with the data structure shown in FIG. 7, the Trie in FIG. 11 includes a number of nodes, 1110 and 1116 each node having elements, 1112 and 1118 corresponding to each letter in the alphabet Σ. As described above, as the node numbers become larger, the number of active elements in a node may decrease, because the database does not contain every possible combination of letters but only a selected set of words.

The structure of the elements of this database differs from that shown in FIG. 7. Each element of each node contains only three fields, a field 1112*a* which holds the character that is represented by the element, a field 1112*b* which holds a pointer, $P_h$ to the HMM 1114 corresponding to the character in field 1112*a*, and a pointer $P_c$ which holds a pointer $P_c$ to a node 1116 in the Trie at the next lower level.

The partitioning technique used in this exemplary method is a modification of the well-known Viterbi algorithm. By this method, HMM's from successive pairs of levels are combined to form a composite HMM. As the strokes in the input sequence are processed, they are consumed by respective states of the combined HMM. Once the most probable combination of two symbols is recognized, the input sequence is trimmed to eliminate all of the strokes which precede the first state of the HMM that corresponds to the lower level node of the Trie. This method of partitioning is described below in-more detail with reference to FIG. 15.

Figure 12A:
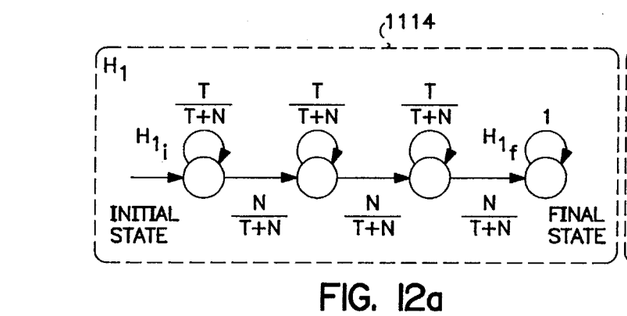
FIGS. 12a, 12b, and 12c are state diagrams representing hidden Markov models which are useful for describing the operation of the second embodiment of the invention.
Figure 12B:
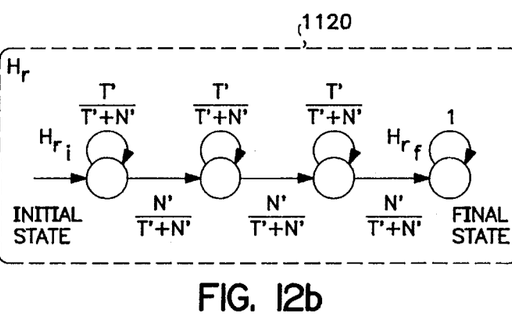
Figure 12C:
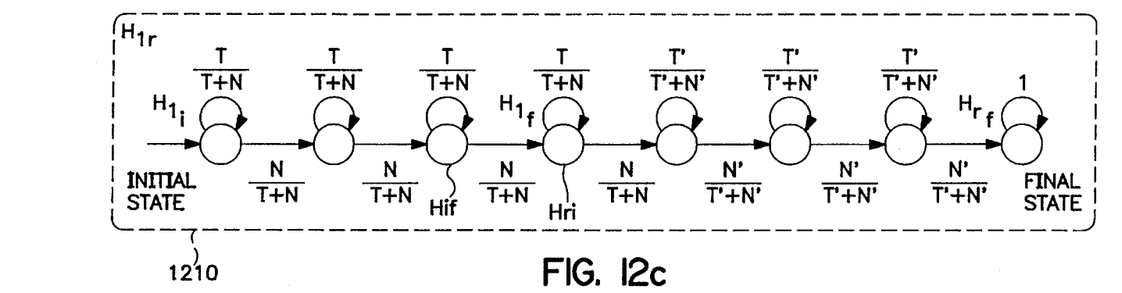

FIGS. 12*a*, 12*b* and 12*c* illustrate the process by which HMM's from successive levels are combined to form a composite HMM. In this example, the HMM 1114, shown in FIG. 4 as being associated with the letter "a," is combined with the HMM 1120 which is associated with the letter "b" to produce the composite HMM 1210, shown in FIG. 12*c*. In combining these HMM's, the transition probabilities of the last state of the HMM 1114 are changed. As a separate HMM, the probability that the HMM 1114 remains in the final state is unity. Once the HMM's 1114 and 1120 have been joined, however, this probability is changed to T/(T+N), the same as the corresponding probability of the other states in the HMM 1114. In addition, a transition from the final state of the HMM 1114 to the initial state of the HMM 1120 is added. This probability is N/(T+N).

Figure 13:
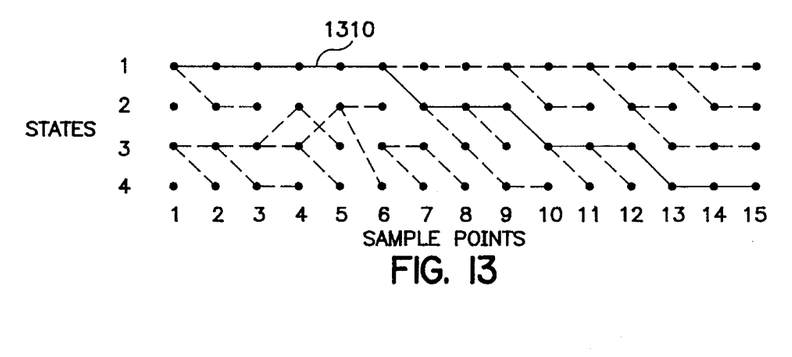
FIG. 13 is a state transition diagram which is useful for describing the operation of the second embodiment of the invention.

The modified Viterbi algorithm is applied as illustrated in FIG. 13 to recognize a pair of letters using the composite HMM 1210. The vertical axis represents the states of the composite HMM. For the sake of simplicity, only four states are shown. The horizontal axis of FIG. 13 represents the sample points (i.e. strokes) occurring in the input sequence. The transition probability map is generated by mapping the input symbols onto the states of the HMM starting at the first input symbol and moving toward the last input symbol. The combined broken and solid lines of FIG. 13 illustrate an exemplary transition probability map. Each line between two points represents a probability of a transition between two states or between a state and itself which consumes one of the input samples.

Once the map has been generated for a given HMM and a given set of input samples, the map is followed from the final symbol back to the first symbol following the path of highest probability. This path represents the most likely mapping of the input symbols onto the states of the HMM. As the forward map is being generated, the algorithm compares the state transitions with state transitions corresponding to the final state of the first HMM and the initial state of the second HMM. These transitions are marked as indicating the point at which the HMM's are joined. The input symbol consumed in this transition is the last symbol of the first letter. By trimming the input sequence to eliminate the prefix up to and including this transition symbol, the method effectively partitions the input sequence into symbols that represent individual letters. This partitioning is beneficial because it uses the extra symbols that are added by the transitions from one letter to the next by incorporating the extra symbols into the composite HMM.

Figure 14:
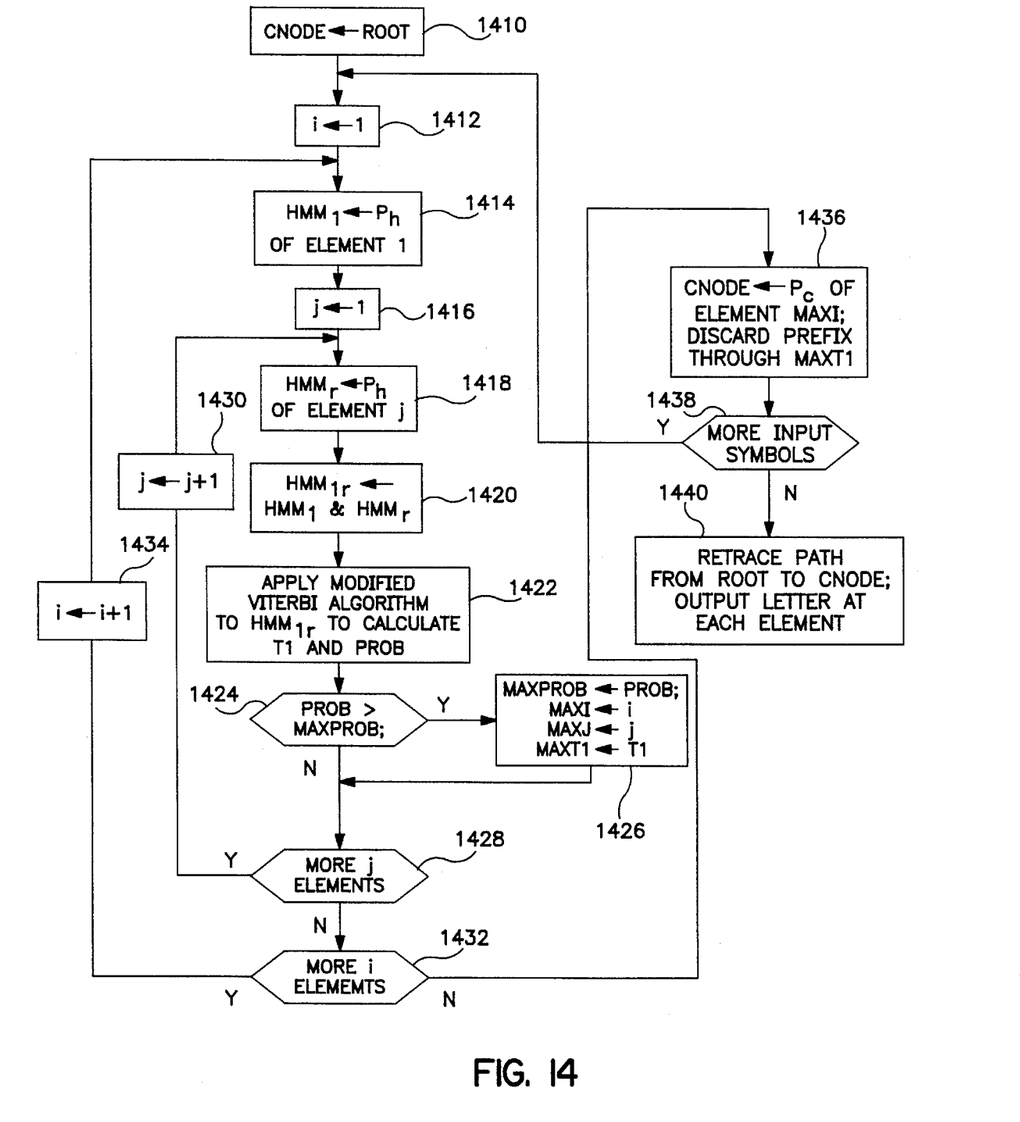
FIG. 14 is a flow chart diagram which is useful for describing the operation of the second embodiment of the invention.

FIG. 14 is a flow-chart diagram which shows the operation of the modified Viterbi algorithm. The first step in this method, step 1410, assigns the root node index to the variable CNODE. At step 1412, the index, i, into the elements of the node CNODE is set to 1. With reference to FIG. 11, CNODE is the node 1110. At step 1414, the HMM of the element i is assigned to a variable $HMM_l$. At step 1416, an inner loop begins which indexes through the elements of the node in the next level down from CNODE. With reference to FIG. 11, this node is 1116.

This inner loop starts at step 1416 by assigning a value of 1 to an index j which is used to index through the elements of the node 1116. Next, at step 1418, the HMM of the element j of node 1116 is assigned to a variable $HMM_r$. At step 1420, the HMM's $HMM_l$ and $HMM_r$ are combined to produce the composite HMM, $HMM_{rl}$. At step 1422, the modified Viterbi algorithm is applied to the composite HMM to calculate values for variables T1 and PROB. The variable T1 represents the transition between the last state of $HMM_r$ and the first state of $HMM_l$ as determined by the modified Viterbi algorithm. The value PROB represents the probability that the input symbols consumed by the $HMM_{rl}$ match the letters represented by element i of node 1110 and element j of node 1116. At step 1412, the algorithm compares PROB to MAXPROB, a variable which holds the maximum match probability of the pairs of elements analyzed in the nested loops. If PROB is greater than MAXPROB, then step 1426 is executed which assigns PROB to MAXPROB, assigns i to MAXI, j to MAXJ and T1 to MAXT1. As described below, T1 is a pointer to the last symbol in the first letter of the pair of letters recognized by the composite HMM. If PROB is not greater than MAXPROB at step 1424 or after step 1426, then step 1428 is executed to determine if j is the last element in node 1116. If there are other elements in the node, then step 1430 increments j to point to the next element and control is transferred to step 1418 to analyze the combination of element i of node 1110 with the new element j of node 1116.

If there are no more elements in node 1116 (i.e. if j is at its maximum value), then step 1432 is executed which determines if there are more elements i in node 1110. If there are more elements in node 1110, step 1434 increments i and control is transferred to step 1414 to determine the matches generated by this new element of node 1110 and each of the elements of node 1116. If there are no more elements in node 1110 at step 1432, control transfers to step 1436. At this step, CNODE is set to the node to which the field $P_c$ of element MAXI points. Also at this step, the prefix of the input sequence ending in T1 is discarded. If more input symbols exist at step 1438, then control transfers to step 1412 to begin processing these remaining symbols using the elements of the new node CNODE. If there are no more symbols in the input sequence then step 1440 is executed which retraces the path from the root node to CNODE and provides the recognized letter at each node.

While the incrementing operations shown in FIG. 14 simply add 1 to the previous values of i and j it is to be understood that this simply represents advancing to the next active element in the node. In a given Trie database, a particular combination of letters may not exist. Accordingly, there may only be a limited number of active elements corresponding to the combinations that exist in the database in the child node $P_c$ of any node that is being evaluated.

Figure 15:
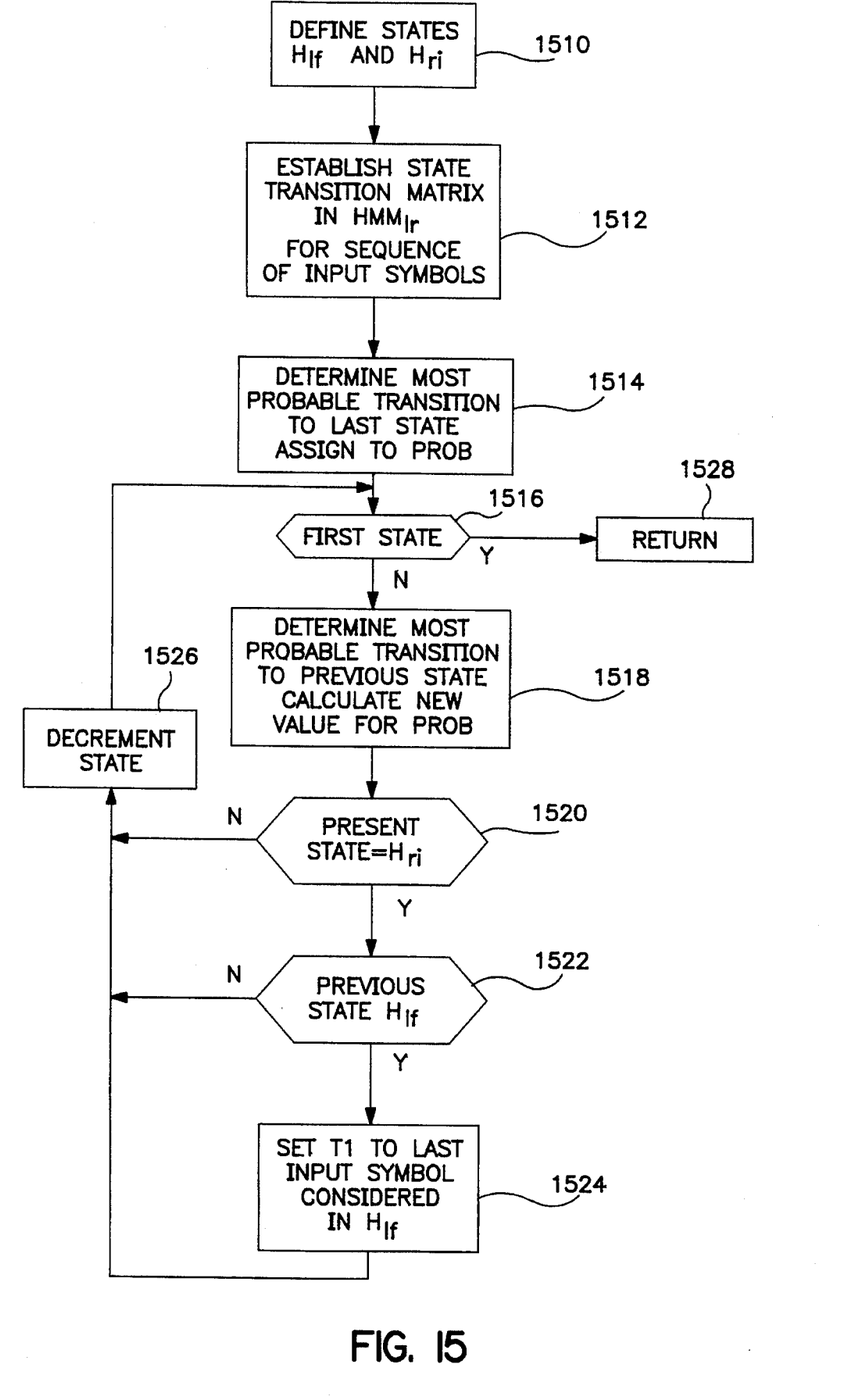
FIG. 15 is a flow chart diagram which shows details of the modified Viterbi algorithm step of the process shown in FIG. 14.

FIG. 15 is a flow-chart diagram which shows details of the modified Viterbi algorithm. At step 1510, the last state, $H_{lf}$, in the HMM of the element i and the first state, $H_{ri}$, in the HMM of the element j are determined. With reference to FIG. 12, these states can be determined with reference back to the individual HMM's 1110 and 1116 which were combined to produce the composite HMM 1210.

The next step in the process, step 1512, generates the state transition probability matrix for the $HMM_{lr}$ based on the sequence of input symbols. This matrix is then analyzed to determine the most probable transition to the last state at step 1514. This step involves comparing the probabilities of the various transitions from the penultimate state to the last state, as indicated by the symbols that are consumed, and choosing the largest probability value. This value is assigned to the variable PROB. At step 1516, the process determines if the state being analyzed is the first state. In the first pass through the loop, this is the last state and so, the condition is not satisfied. When, during the analysis of subsequent states, the condition at step 1516 is satisfied, the process terminates at step 1528 and control is returned to step 1424 of FIG. 14.

At step 1518, the process determines the most probable transition from the state being analyzed to the previous state based on the symbols that were consumed and calculates a new value for the variable PROB. This new value may be, for example, the product of the current value of PROB and the probability value for the most probable transition to the previous state. At step 1520, the process checks the present state to determine if it is the same as $H_{ri}$ the first state of the HMM of the child node. If it is the same, the step 1522 is executed to determine if the previous state in the transition matrix is $H_{lf}$ the final state in the HMM of the parent node. If both of these conditions are met, then the symbol pointer indicating the symbols that are consumed by the transition from the previous state to the current state is assigned to the variable T1. If the either of the tests at steps 1520 and 1522 are not met or after step 1524 if both tests are met, step 1526 is executed which decrements the present state. Following step 1526, control transfers to step 1516. Steps 1514 through 1526 represent the backwards phase of the modified Viterbi algorithm. The values produced by this process are a variable PROB which contains the products of the state transitions in the composite HMM that consumed the input symbols and a variable T1 which indicates the dividing point between the two letters which are represented by the composite HMM.

The use of this modified Viterbi algorithm with a Trie database provides an effective and efficient way of accessing handwritten data items and any other data that may be associated with these items. The Trie database structure reduces the number of computations involved by limiting the possible combinations of handwritten data values to those representing words that are stored in the database. The modified Viterbi algorithm provides an effective way of processing input and partitioning symbols using the HMM's that are stored in the Trie database. The partitioning method that is based on processing the input sequence based on minima, maxim and inflection points is also effective when used with a Trie database structure.

While the invention has been described in terms of exemplary embodiments, it is contemplated that it may be practiced as outlined above within the spirit and scope of the following claims.

The Invention claimed is:

1. A method for matching an input sequence of continuously connected handwritten objects to one of a plurality of objects which are modeled by concatenating members of a set of component objects, the method comprising the steps of:

(a) generating a Trie data structure representing the plurality of objects, the Trie data structure having a plurality of nodes divided into a plurality of levels, wherein each node includes a plurality of elements, including the steps of:

assigning component objects of each of the plurality of objects to respective elements of respective nodes of the Trie data structure, associating identifying characteristics of the respective component objects with each element in each node of the Trie data structure, wherein the identifying characteristics are numbers of local minima, local maxima and inflection points in each of the component objects, and associating a respective hidden Markov model with each element of each node, the hidden Markov model representing the respective component object of the element;

(b) selecting a node of the Trie data structure;

(c) applying the input sequence of continuously connected handwritten objects to each of the hidden Markov models associated with the respective plurality of elements of the selected node to generate a respective plurality of acceptance values;

(d) identifying a segment of the input sequence with the element of the selected node that generates the acceptance value which is larger than any other one of the acceptance values, based on the identifying characteristics associated with the element, without interference from a portion of the input sequence that does not correspond to the component object assigned to the element; and (e) deleting the identified segment from the input sequence of continuously connected handwritten objects.

2. A method according to claim 1, further including the steps of:

(f) repeating steps (b) through (e) at successive levels of the Trie data structure until each segment of the input sequence has been identified with an element of a node of the Trie data structure; and (g) concatenating the component objects that are associated with the respective identified elements to identify one of the objects in the Trie data structure which matches the input sequence.

3. A method according to claim 1, wherein the step of associating a respective hidden Markov model with each element of each node includes the step of generating the hidden Markov model for the respective component object, the generated hidden Markov model being a left to right structure having a final state and the final state has a probability of one associated with remaining in the final state.

4. A method according to claim 1, wherein the component objects are handwritten letters.

5. A method for matching an input sequence of continuously connected handwritten objects representing a plurality of handwritten letters to one of a plurality of words which are modeled by concatenating letters, the method comprising the steps of:

(a) generating a Trie data structure representing the plurality of words, the Trie data structure having a plurality of nodes divided into a plurality of levels, wherein each node includes a plurality of elements, including the steps of:

assigning respective letters of each of the words to each of the respective elements of respective nodes of the Trie data structure, associating identifying characteristics of the respective letters with each element in each node of the Trie data structure, wherein the identifying characteristics are numbers of local minima, local maxima and inflection points in each of the letters, and associating a respective hidden Markov model with each element of each node, the hidden Markov model representing the respective letter of the element;

(b) selecting a node of the Trie data structure;

(c) applying the input sequence of continuously connected handwritten objects to each of the hidden Markov models associated with the respective plurality of elements of the selected node to generate a respective plurality of acceptance values;

(d) identifying a segment of the input sequence with the element of the selected node that generates the acceptance value which is larger than any other one of the acceptance values, based on the identifying characteristics associated with the element, without interference from a portion of the input sequence adjacent to the segment, wherein the segment of the input sequence forms a single letter or a portion of a single letter and said portion represents a connecting stroke adjacent to the letters; and (e) deleting the identified segment from the input sequence.

6. A method according to claim 5, further including the steps of:

(f) repeating steps (b) through (e) at successive levels of the Trie data structure until each segment of the input sequence has been identified with an element of a node of the Trie data structure; and (g) concatenating the letters that are associated with the respective identified elements to identify one of the words in the Trie data structure which matches the input sequence.

7. A method of segmenting a continuous data stream representing a first object and a second object, where the first object and second object are modeled by respective first and second hidden Markov models, each having a plurality of states, the method comprising the steps of:

concatenating the first and second hidden Markov models to generate a combined hidden Markov model of the continuous data stream;

identifying a first transition state of the combined hidden Markov model as representing a last state of the first hidden Markov model;

identifying a second transition state of the combined hidden Markov model as representing a first state of the second hidden Markov model;

applying the continuous data stream to the combined hidden Markov model to generate a state transition matrix;

identifying, from the state transition matrix, a most probable state sequence which represents the continuous data stream, including the steps of:

comparing each target state in the most probable state sequence with the second transition state to determine equality;

if the target state equals the second transition state, comparing the state preceding the target state in the most probable state sequence to the first transition state;

if the state preceding the target state is found to be equal to the first transition state, identifying a portion of the continuous data stream which corresponds to the target state as a segment boundary in the continuous data stream.

8. A method according to claim 7, wherein the first object and the second object are handwritten letters.

9. A method according to claim 7, wherein the method further comprises, before the step of concatenating, the step of:

generating a Trie data structure representing a plurality of object sequences, the Trie data structure having a plurality of nodes divided into a plurality of levels, wherein each node includes a plurality of elements, including the steps of:

assigning objects within each of the plurality of object sequences to respective elements of respective nodes of the Trie data structure; and associating a respective hidden Markov model with each element of each node, the hidden Markov model representing the respective object of the element, wherein the first and second hidden Markov models are associated with elements of respective first and second nodes within the Trie data structure, said second node being a child of the first node.

* * * * *